United States Patent
Kondratowicz et al.

(10) Patent No.: US 11,267,170 B2
(45) Date of Patent: *Mar. 8, 2022

(54) PROCESS FOR THE PRODUCTION OF EXPANDABLE VINYL AROMATIC POLYMER GRANULATE HAVING DECREASED THERMAL CONDUCTIVITY

(71) Applicant: SYNTHOS S.A., Oswiecim (PL)

(72) Inventors: Filip Lukasz Kondratowicz, Cracow (PL); Piotr Rojek, Cracow (PL); Marzena Mikoszek-Operchalska, Ruda Slaska (PL); Kamil Utrata, Cwiklice (PL)

(73) Assignee: SYNTHOS S.A., Oswiecim (PL)

( * ) Notice: Subject to any disclaimer, the term of this patent is extended or adjusted under 35 U.S.C. 154(b) by 123 days.

This patent is subject to a terminal disclaimer.

(21) Appl. No.: 16/422,049

(22) Filed: May 24, 2019

(65) Prior Publication Data

US 2019/0283286 A1    Sep. 19, 2019

Related U.S. Application Data

(63) Continuation of application No. 15/543,319, filed as application No. PCT/EP2016/050637 on Jan. 14, 2016, now Pat. No. 10,639,829.

(30) Foreign Application Priority Data

Jan. 14, 2015   (EP) .................................. 15461504

(51) Int. Cl.
*B29C 44/34* (2006.01)
*C08J 9/18* (2006.01)
(Continued)

(52) U.S. Cl.
CPC ...... *B29C 44/3442* (2013.01); *B29C 44/3461* (2013.01); *B29C 44/50* (2013.01);
(Continued)

(58) Field of Classification Search
CPC . B29C 44/3442; B29C 44/50; B29C 44/3461; B29C 44/3415; C08J 9/232;
(Continued)

(56) References Cited

U.S. PATENT DOCUMENTS 3,393,260 A    7/1968   Miler
6,340,713 B1   1/2002   Glück et al.
(Continued)

FOREIGN PATENT DOCUMENTS

CN    101068863    11/2007
CN    102307937    1/2012
(Continued)

OTHER PUBLICATIONS

Office Action issued in China, Application. No. 201680015877.5, dated Dec. 2, 2019 (with translation) 12 pages.
(Continued)

*Primary Examiner* — Kara B Boyle
(74) *Attorney, Agent, or Firm* — Nixon & Vanderhye P.C.

(57) ABSTRACT

The invention relates to an extrusion process for the production of expandable vinyl aromatic polymer granulate comprising mixing first and second additives with first and second polymer components, respectively, in dedicated mixers.

23 Claims, 1 Drawing Sheet

(51) Int. Cl.
*B29C 44/50* (2006.01)
*C08J 9/232* (2006.01)
*C08J 9/00* (2006.01)
*B29K 105/00* (2006.01)
*B29K 25/00* (2006.01)

(52) U.S. Cl.
CPC .......... *C08J 9/0014* (2013.01); *C08J 9/0061* (2013.01); *C08J 9/18* (2013.01); *C08J 9/232* (2013.01); *B29C 44/3415* (2013.01); *B29K 2025/00* (2013.01); *B29K 2025/04* (2013.01); *B29K 2105/0026* (2013.01); *B29K 2995/0015* (2013.01); *B29K 2995/0063* (2013.01); *C08J 2201/022* (2013.01); *C08J 2201/03* (2013.01); *C08J 2325/06* (2013.01)

(58) Field of Classification Search
CPC . C08J 9/0014; C08J 9/0016; C08J 9/18; C08J 2201/022; C08J 2201/03; C08J 2325/06; C08J 2417/10; C08J 2425/08; C08J 9/0066; C08J 3/22; B29K 2025/00; B29K 2025/04; B29K 2995/0015; B29K 2995/0063; B29K 2105/0026; B29K 2025/06; B29B 9/065; B29B 7/005; B29B 7/244; B29B 7/7485; B29B 7/88; B29B 7/90; B29B 9/12; C08K 3/04; C08K 3/32; C08K 2003/325
See application file for complete search history.

(56) References Cited

U.S. PATENT DOCUMENTS

| | | | |
|---|---|---|---|
| 7,135,263 | B2 | 11/2006 | Kawakami et al. |
| 2005/0075442 | A1 | 4/2005 | Titelman et al. |
| 2007/0112082 | A1 | 5/2007 | Hahn et al. |
| 2008/0028994 | A1 | 2/2008 | Barlet-Gouedard et al. |
| 2008/0096988 | A1* | 4/2008 | Hahn .............. C08J 9/16 521/56 |
| 2008/0203597 | A1 | 8/2008 | Rogov et al. |
| 2008/0249199 | A1 | 10/2008 | Nising |
| 2009/0013907 | A1 | 1/2009 | Boxley et al. |
| 2009/0030096 | A1* | 1/2009 | Lee .............. C08F 292/00 521/60 |
| 2010/0148110 | A1 | 6/2010 | Casalini et al. |
| 2011/0213045 | A1 | 9/2011 | Handl |
| 2011/0224316 | A1 | 9/2011 | Ferstl et al. |
| 2011/0284793 | A1 | 11/2011 | Ponticiello et al. |
| 2012/0032103 | A1 | 2/2012 | Ulanova et al. |
| 2012/0091388 | A1 | 4/2012 | Felisari et al. |
| 2012/0216716 | A1 | 8/2012 | Boxley et al. |
| 2012/0264836 | A1 | 10/2012 | Felisari et al. |
| 2012/0322905 | A1 | 12/2012 | Kusanose et al. |
| 2014/0001394 | A1 | 1/2014 | Nowe et al. |
| 2014/0005302 | A1 | 1/2014 | Briand et al. |
| 2014/0184249 | A1 | 7/2014 | Saafi et al. |
| 2015/0114641 | A1 | 4/2015 | Bestaoui-Spurr et al. |

FOREIGN PATENT DOCUMENTS

| | | |
|---|---|---|
| CN | 102666686 | 9/2012 |
| DE | 198 28 250 | 12/1999 |
| DE | 102004058583 | 3/2004 |
| DE | 103 41 298 | 3/2005 |
| DE | 10 2004 034 516 | 2/2006 |
| DE | 10 2013 001 927 | 8/2014 |
| EP | 0 620 246 | 10/1994 |
| EP | 0 632 522 | 1/1995 |
| EP | 0 856 353 | 8/1998 |
| EP | 0 863 175 | 9/1998 |
| EP | 1 031 600 | 8/2000 |
| EP | 0 981 574 | 9/2000 |
| EP | 1 159 338 | 12/2001 |
| EP | 1 661 940 | 5/2006 |
| EP | 1 693 413 | 8/2006 |
| EP | 1 771 502 | 4/2007 |
| EP | 1 892 034 | 2/2008 |
| EP | 2 025 961 | 2/2009 |
| EP | 1 758 951 | 5/2010 |
| EP | 3 245 247 | 12/2018 |
| EP | 3 245 172 | 1/2019 |
| FR | 2 964 113 | 3/2012 |
| JP | 63-183941 | 7/1988 |
| JP | 7-022834 | 1/1995 |
| JP | 8-311232 | 11/1996 |
| JP | 2001-151900 | 6/2001 |
| JP | 2001-250423 | 9/2001 |
| JP | 2001-279014 | 10/2001 |
| JP | 2001279014 | 10/2001 |
| JP | 2002-121310 | 4/2002 |
| JP | 2007-514027 | 5/2007 |
| JP | 2009-144134 | 7/2009 |
| JP | 2010-527391 | 8/2010 |
| JP | 2012-136712 | 7/2012 |
| JP | 2012-526170 | 10/2012 |
| JP | 2013-507477 | 3/2013 |
| JP | 2013-159632 | 8/2013 |
| JP | 2014-80514 | 5/2014 |
| JP | 2014-118474 A | 6/2014 |
| JP | 2014-148661 | 8/2014 |
| KR | 10-1431002 | 9/2014 |
| WO | WO 97/45477 | 12/1997 |
| WO | WO 98/31644 | 7/1998 |
| WO | WO 98/51734 | 11/1998 |
| WO | WO 00/43442 | 7/2000 |
| WO | WO 02/055594 | 7/2002 |
| WO | WO 2004/087798 | 10/2004 |
| WO | WO 2005/123816 | 12/2005 |
| WO | WO 2006/007995 | 1/2006 |
| WO | WO 2006/058733 | 6/2006 |
| WO | WO 2006/061571 | 6/2006 |
| WO | WO 2008/061678 | 5/2008 |
| WO | WO 2008/141766 | 11/2008 |
| WO | WO 2009/009089 | 1/2009 |
| WO | WO 2010/128369 | 11/2010 |
| WO | WO 2010/141976 | 12/2010 |
| WO | WO 2010/149624 | 12/2010 |
| WO | WO 2011/042800 | 4/2011 |
| WO | WO 2011/092250 | 8/2011 |
| WO | WO 2012/024708 | 3/2012 |
| WO | WO 2012/024709 | 3/2012 |
| WO | WO 2012/032022 | 3/2012 |
| WO | WO 2012/052423 | 4/2012 |
| WO | WO 2012/146577 | 11/2012 |
| WO | WO 2015/065710 | 5/2015 |
| WO | WO 2016/113321 | 7/2016 |

OTHER PUBLICATIONS

Office Action issued in India, Application No. 201717024832, dated Dec. 19, 2019 (with translation), 6 pages.
Office Action issued in China Application No. 201680015357.4, dated Jan. 2, 2020, 6 pages.
Office Action issued in India, Application No. 201717024821, dated Jan. 9, 2020 (with translation), 6 pages.
International Preliminary Report on Patentability for PCT/EP2016/050637, dated Jun. 2, 2017.
International Preliminary Report on Patentability for PCT/EP2016/050594, dated Apr. 21, 2017.
International Preliminary Report on Patentability for PCT/EP2016/050616, dated Jul. 18, 2017.
International Preliminary Report on Patentability for PCT/EP2016/050627, dated Apr. 26, 2017.
International Search Report for PCT/EP2016/050594, dated Apr. 6, 2016.
International Search Report for PCT/EP2016/050616, dated Mar. 30, 2016.
International Search Report for PCT/EP2016/050627, dated Apr. 11, 2016.

(56) References Cited

OTHER PUBLICATIONS

International Search Report for PCT/EP2016/050637, dated Apr. 7, 2016.
Office Action issued in U.S. Appl. No. 15/543,307 dated Jun. 17, 2019.
Search Report issued in EP Appln. No. 19150362.2 dated Mar. 18, 2019.
Written Opinion of the ISA for PCT/EP2016/050594, dated Apr. 6, 2016.
Written Opinion of the ISA for PCT/EP2016/050637, dated Apr. 7, 2016.
Letter accompanying the Demand dated Nov. 14, 2016 from Synthos S.A. to EPO in PCT/EP2016/050627 with experimental report dated Nov. 14, 2016 with Annexes 1 and 2.
Naoki, "Dielectric cellular moldings with improved dimensional stability for spherical Luneburg lenses", Chemical Abstracts Service, XP002741017, Oct. 10, 2001 (refers to JP 2001-279014).
Shigehiko et al., "Manufacture of foamable resin particles containing ceramics", Chemical Abstracts Service, XP002741016, Feb. 17, 1997, 2 pages (refers to JP 8-311232).
Yuan et al., "Suspension Polymerization" *Journal of Macromolecular Science, Part C: Polymer Reviews*, C31: 2 & 3, 215-299 (1991).
Office Action issued in BR Appln. No. 112017014972-9 dated Jan. 21, 2020 (w/ partial translation).
Office Action issued in BR Appln. No. 112017014925-7 dated Jan. 27, 2020 (w/ partial translation).
Office Action issued in U.S. Appl. No. 15/543,336 dated Dec. 16, 2019.
Notice of Opposition issued in EP Appln. No. 16700595.8 dated Jun. 5, 2019.
Busico et al., "Physical Characterization of Layered Perovskites—Polystyrene Composites" *Journal of Applied Polymer Science*, vol. 25: 2857-2868 (1980).
Encyclopedia of Polymer Science and Technology, Concise Third Edition, p. 43 (2007).
Last, "Infrared-Absorption Studies on Barium Titanate and Related Materials" *Physical Review*, vol. 105, No. 6: 1740-1750 (Mar. 15, 1957).
Luxon et al., "Effect of Particle Size and Shape on the Infrared Absorption Spectra of Barium Titanate and Strontium Titanate Powders" *Journal of Applied Physics*, vol. 41, No. 6: 2303-2307 (May 1970).
Posch et al., "Infrared Properties of Solid Titanium Oxides: Exploring Potential Primary Dust Condensates" *The Astrophysical Journal Supplement Series*, vol. 149: 437-445 (Dec. 2003).
Random House Webster's Unabridged Dictionary, Second Edition, propagation to prophylaxis, 1 page (1998).
Roth, "Classification of Perovskite and Other $ABO_3$-Type Compounds" *Journal of Research of the National Bureau of Standards*, vol. 58, No. 2: 75-88 (Feb. 1957).
Sheng et al., Catalytically Synergistic Effects of Novel $LaMnO_3$ Composite Metal Oxide in Intumescent Flame-Retardant Polypropylene System *Polymer Composites*, pp. 2390-2400 (2014).
Tarun et al., "Infrared absorption of hydrogen-related defects in strontium titanate" *Journal of Applied Physics*, vol. 109: 063706-1-063706-4 (2011).
Win et al., "Synthesis of Barium Titanate from Titanyl Acylate Precursor by Sol-precipitate Method" *Jour. Myan. Acad. Arts & Sc.*, vol. VI, No. 1: 61-70 (2008).
Zhang et al., "Preparation and Characterization of Calcium Titanate ($CaTiO_3$) Whiskers via Molten Salt Method" *Advanced Materials Research*, vol. 630: 89-92 (2013).
Office Action issued in JP Appln. No. 2017-537274 dated Oct. 15, 2019 (w/ translation).
Office Action issued in JP Appln. No. 2017-537278 dated Oct. 8, 2019 (w/ translation).
Office Action issued in JP Appln. No. 2017-537284 dated Jun. 4, 2019 (w/ partial translation).
Opposition filed against EP Patent No. 3 245 247 (Appln. No. 16701911.6) dated Sep. 26, 2019.
Opposition filed against EP Patent No. 3 245 172 (Appln. No. 16700584.2) dated Oct. 9, 2019.
Submission by Applicant in EP Appln. No. 16701911.6 dated Apr. 3, 2018.
Submission by Applicant (accompanying Demand) in PCT/EP2016/050594 dated Nov. 14, 2016.
De Weerdt, "Geopolymers—State of the art" *COIN Project Report* 37 (2011).
Duxson et al., "Geopolymer technology: the current state of the art" *Journal of Materials Science* vol. 42, No. 9: 2917-2933 (2007).
IUPAC. Compendium of Chemical Terminology, 2nd ed. (the "Gold Book"). Compiled by A. D. McNaught and A. Wilkinson. Blackwell Scientific Publications, Oxford (1997). Online version (2019-) created by S. J. Chalk. ISBN 0-9678550-9-8. https://doi.org/10.1351/goldbook.
Škvára, "Alkali Activated Materials or Geopolymers?" *Ceramics Silikaty*, vol. 51, No. 3: 173-177 (2007).
Technical Bulletin Fine Particles by Degussa AG, No. 11, pp. 1-71 (2006).

* cited by examiner

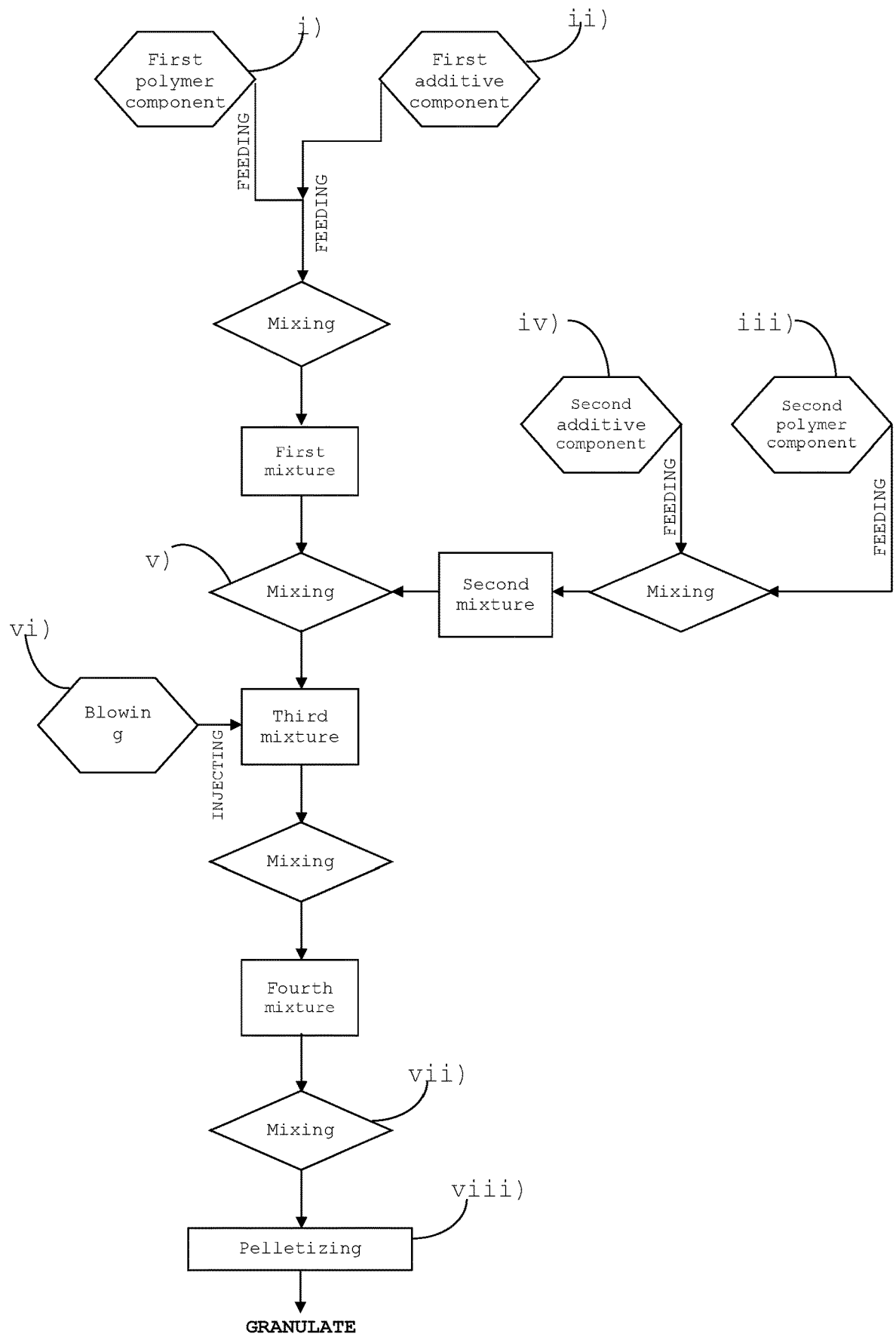

PROCESS FOR THE PRODUCTION OF EXPANDABLE VINYL AROMATIC POLYMER GRANULATE HAVING DECREASED THERMAL CONDUCTIVITY

This application is a continuation of U.S. application Ser. No. 15/543,319 filed Jul. 13, 2017, which is the U.S. national phase of International Application No. PCT/EP2016/050637 filed Jan. 14, 2016, which designated the U.S. and claims priority to EP Patent Application No. 15461504.1 filed Jan. 14, 2015, the entire contents of each of which are hereby incorporated by reference.

The present invention relates to an extrusion process for the production of expandable vinyl aromatic polymer granulate, the expandable polymers granulate as producible thereby, and vinyl aromatic polymer foam producible from such granulate.

Vinyl aromatic polymers are known and used for the preparation of expanded products that are adopted in various applications, of which the most important one is for thermal insulation. This is why there is a continuously increasing demand for expanded vinyl aromatic polymers with both low thermal conductivity and good mechanical and self-extinguishing properties.

It is generally known that the addition of athermanous fillers from the group of heat absorbers (e.g. carbon black), heat scatterers (e.g. minerals from the group of silicas and titanium oxides) and heat reflectors (e.g. aluminium pigment and graphite) decreases the thermal conductivity of polymers. Examples for such types of polymers are those obtained by polymerization of vinyl aromatic monomers (in particular of styrene) and optionally comonomers.

Typically, the addition of a combination of athermanous fillers that can absorb or scatter heat radiation to prolong the IR rays' pathway results in a significant reduction of thermal conductivity. However, the most advantageous effect results from the addition of IR reflectors. A combination of IR scatterers and IR reflectors can influence the reduction of the concentration of typical IR absorbers (such as carbon black), and leads to an improvement of the self-extinguishing effect of polystyrene foams.

US 2008/0 249 199 A1 teaches a method for the manufacture of foamed or foamable particles from a polymer melt. A recycled polymer melt is introduced into the polymer melt through a side extruder and may include additive. This is said to be more economical than the use of a masterbatch. If bromide-containing flame protection agents or other thermally unstable additives are present in the recycled polymer, or are added to the recycled polymer, the process temperature in the side extruder and in all following system components should not exceed a temperature and dwell time limiting value which is defined by the thermal stability of the additives.

WO 2006/058733 A1 teaches expandable styrene polymer granulates containing a) filler selected from the group of inorganic powder materials such as silicic acid and b) carbon black or graphite. Further, EP 0 863 175, EP 0 981 574, EP 1 758 951 and EP 1 771 502 A2 teach the use of graphite in polystyrene foam obtained by an extrusion process.

WO 2006/058733 also teaches that the mechanical properties of thermoplastic polymers containing fillers can be improved by using adhesion promoters (coupling agents), such as maleic anhydride modified styrene copolymers, epoxy group containing polymers, organosilanes or styrene copolymers having isocyanate or acid group. Similar to US 2008/0 249 199 A1, WO 2006/058733 A1 also proposes to use side extruders for introducing additives such as solids and thermally sensitive additives. This arrangement is, however, undesirable in situations where additives that are not thermally sensitive, but rather require thorough mixing, are to be introduced. This is because large amounts of material would need to be processed if additives that require thorough mixing were to be introduced into the main portion of the polymer. This is economically undesirable. The addition of dedicated coupling agents is likewise undesirable, especially if they need to be used in large amounts.

WO 2004/087798 A1 teaches expandable vinyl aromatic polymers comprising, in a polymer matrix, a type of carbon black having an active surface area ranging from 5 to 40 $m^2/g$. The thermal conductivity of a material with a density of 14 g/l is reported to be 36.5 mW/m·K.

WO 2006/061571 A1 teaches an expandable polystyrene composition comprising carbon black as an additive, the carbon black having a very high BET surface, as measured according to ASTM D 6556, ranging from 550 to 1,600 $m^2/g$. The examples report polystyrene foam with a thermal conductivity of 36.16 mW/M·K at density 13.3 g/l according to ASTM D 1622, and 34.21 mW/M·K at density 19.4 g/l, respectively.

WO 2008/061678 A2 discloses the use of carbon black having a specific electric conductivity, to reduce the thermal conductivity of expandable vinyl aromatic polymers. The carbon black is introduced during suspension polymerization, or during polymer extrusion. The examples report polystyrene foam having a thermal conductivity of 31.0 mW/M·K at a density of 17 g/l.

Japanese patent JP 63183941 teaches the use of aluminium pigment, titanium dioxide and graphite, having specific particle size and heat radiation reflectivity, to reduce the thermal conductivity of polystyrene foams. Examples 7 to 11 teach polystyrene foam produced by an extrusion process and having a thermal conductivity of 25 to 30 mW/M·K, where as starting material masterbatches were used.

WO 2005/123816 A1 teaches styrene polymer particle foam materials.

WO 2004/087798 A1 teaches expandable polystyrenes containing carbon black. In a suspension polymerization process, the carbon black is present during the polymerization in aqueous suspension. Also disclosed is a continuous process for preparing expandable polystyrene in mass, wherein the polymer is fed together with carbon black into an extruder, and, subsequently, expanding agent and possible further additives are then injected into the molten polymer before extrusion through a die.

As mentioned, one of the solutions to decrease the thermal conductivity of expanded vinyl polymers is the addition thereto of athermanous fillers. However, the presence of athermanous fillers often leads to a deterioration of the self-extinguishing and mechanical properties of the expanded vinyl aromatic polymer foam. It is for instance commonly known that foams made of vinyl aromatic polymers and comprising carbon-based athermanous fillers have much worse self-extinguishing properties. Consequently, a higher concentration of flame retardant must be used to achieve suitable performance for passing the flammability test according to the German industry standard DIN 4102 (B1, B2). Further, when using types of carbon black having a highly developed active surface, such as a BET surface of above 40 $m^2/g$, the self-extinguishing properties are insufficient in order to pass DIN 4102 (B1, B2).

On the other hand, the presence of small amounts of athermanous fillers of the heat scatterer type, e.g. minerals (such as silicas, calcium phosphates and minerals with perovskite structure), does not cause a substantial deterioration of the flame retarded polymer foam's self-extinguishing properties. Rather, these properties are improved, but the decrease of the foam's thermal conductivity is not as pronounced as it would be in foams comprising carbon-based additives, i.e. comprising athermanous additives of the heat absorber or of the heat reflector type (in particular carbon blacks and/or graphites).

Thus, the desired expanded vinyl aromatic polymer foam should contain athermanous filler(s) of the type and in an amount that maintains the foam's self-extinguishing and mechanical properties in the same range as in an expanded vinyl aromatic polymer without such fillers, and that at the same time decreases the thermal conductivity of the foam.

US 2008/0 203 597 A1 teaches a method for producing expanding styrene polymer granules. The method includes the supply of a polymer melt and expanding agent flows to the mixing zone.

Additives or agents are loaded into the mixing zone and are uniformly distributed in the polymer melt together with the expanding agent by thorough shear mixing. However, the foams producible from the granulate according to US 2008/0203597 A1 have poor thermal and mechanical properties.

EP 0 856 353 A1 teaches modules for a static mixer and their application for the incorporation of additives into PVC. EP 1 892 034 A1 relates to the production of moulded masses from a raw material melt into which additives are introduced.

US 2012/264 836 A1 teaches nanocomposite compositions based on expandable thermoplastic polymers which comprise a) a polymeric matrix produced by the polymerization of a base comprising one or more polymerizable monomers, b) an expanding agent englobed in the polymeric matrix, and c) an athermanous filler comprising nano-scaled graphene plates having specific dimensions.

DE 10 2004 034 516 A1 relates to a method for the production of flameproof, expandable styrol polymers (EPS) by extruding a styrol polymer melt, the melt containing propellant and flameproofing agent, through a nozzle plate, and subsequent under water granulation.

WO 2012/032 022 A1 discloses an expandable vinyl aromatic polymer which comprises: a) a matrix of a vinyl aromatic polymer, b) expanding agent englobed in the polymeric matrix, c) talc having specific dimensions, d) carbon black, and optionally e) one or more fillers, other than talc and carbon black, homogeneously distributed in the polymeric matrix.

There is a continuous need for improved foams prepared from polymer based on vinyl aromatic monomer and optionally one or more comonomers having improved mechanical, thermal, and self-extinguishing properties, as well as processes for their production.

According to the present invention, this object is solved by an extrusion process for the production of expandable vinyl aromatic polymer granulate comprising the steps:
  i) feeding a first polymer component comprising vinyl aromatic polymer into a first mixer;
  ii) feeding a first additive component a) into the first mixer, to produce a first mixture from the first polymer component and the first additive component;
  iii) feeding a second polymer component b) comprising vinyl aromatic polymer into a second mixer;
  iv) feeding a second additive component b) into the second mixer, to produce a second mixture from the second polymer component and the second additive component, wherein the processing conditions in the second mixer are more severe than the processing conditions in the first mixer, by providing higher shear force;
  v) combining the first and second mixtures, to produce a third mixture;
  vi) injecting blowing agent c) into the third mixture, to produce a fourth mixture;
  vii) mixing the fourth mixture; and
  viii) pelletizing the fourth mixture, to obtain the granulate.

The process of the invention comprises an extrusion. The process allows for the separate addition of first and second additive components into a mixture that is ultimately charged with propellant and is pelletized, so as to obtain the expandable granulate. Because of the separate addition of the first and second additive components, the process according to the invention is highly flexible and allows for the processing of additives that have very different processing requirements, in particular in view of their stability under those processing conditions that are necessary so that the different additive components can best perform their desired function. Thus, the process according to the invention is broadly applicable to any type of first and second additive components, a) and b).

In contrast to WO 2006/058733 A1, the process according to the invention allows for the separate introduction of different additives. The conditions in the respective mixers can thus be adapted to the specific requirements, so that the required amount of e.g. added coupling agent for fillers (including athermanous fillers), or any other compatibilizing agents, can be reduced, or the addition of coupling agent can even completely be dispensed with.

It has in particular been found in accordance with the present invention that the co-use of b1) silica, calcium phosphate, mineral having perovskite structure, geopolymer and/or geopolymer composite, and b2) carbon black, graphite, and/or coke, in a polymer based on one vinyl aromatic monomer (and optionally one or more comonomers), decreases the thermal conductivity of foam prepared from a polymer based on a vinyl aromatic monomer and optionally one or more comonomers, without adversely affecting the foam's flammability and mechanical properties.

According to the process of US 2008/0 249 199 A1, one must observe very specific processing conditions because the blends already contain the amount of propellant as desired in the resultant granulate when further agents are added. The process according to the present invention instead advantageously allows for the separate introduction of different additives, prior to the introduction of propellant, and there is no need to observe specific conditions (other than those processing conditions that may be required by the particular additive).

It was also found that the self-extinguishing properties of expanded vinyl aromatic polymers are improved, possibly by the grafting of vinyl aromatic comonomer or oligomer onto the surface of carbon black, in particular when p-tert-butyl styrene or similar monomer such as p-vinyl toluene, other methylstyrene isomers, divinylobenzene or its isomers are used as comonomer.

It is commonly known that carbon blacks are strong radical scavengers. The more severe processing in the second mixer, e.g. a twin-screw co-rotating extruder, may lead to a small, but highly effective mechano-chemical degradation of the aforementioned polymers, which generates macroradicals, which in turn graft onto the carbon black's surface, thereby improving the self-extinguishing properties by eventually separating the carbon black from e.g. any brominated flame-retardants based on styrene-butadiene rubbers. Generally, any degradation and crosslinking of brominated flame-retardant that would otherwise be caused by the presence of carbon black is prevented or significantly reduced. Thus, the concentration of polymeric brominated flame-retardant in expanded vinyl aromatic polymers with carbon black can be significantly reduced.

The other advantage is that carbon black with grafted surface has less radical activity, and carbon black's usually strong inhibiting ability for any radical reactions is thus significantly reduced. This is especially important in those flame retardancy processes that are induced by a brominated flame retardant, where bromine radicals are active in the gas phase. As a consequence of grafting the carbon black's surface, the surface is not able to scavenge the bromine radicals and any other important radical species involved in the self-extinguishing process of expanded vinyl aromatic polymers.

DETAILED DESCRIPTION

Thus, in a first aspect, the invention relates to an extrusion process for the production of expandable vinyl aromatic polymer granulate comprising the steps:
i) feeding a first polymer component comprising vinyl aromatic polymer into a first mixer;
ii) feeding a first additive component a) into the first mixer, to produce a first mixture from the first polymer component and the first additive component;
iii) feeding a second polymer component b) comprising vinyl aromatic polymer into a second mixer;
iv) feeding a second additive component b) into the second mixer, to produce a second mixture from the second polymer component and the second additive component, wherein the processing conditions in the second mixer are more severe than the processing conditions in the first mixer, by providing higher shear force;
v) combining the first and second mixtures, to produce a third mixture;
vi) injecting blowing agent c) into the third mixture, to produce a fourth mixture;
vii) mixing the fourth mixture; and
viii) pelletizing the fourth mixture, to obtain the granulate.

According to the invention, the process comprises an extrusion. Preferably, the combining v) is a feeding of the second mixture into the first mixer, to produce the third mixture. In this preferred embodiment, the production of the first mixture takes place upstream from the point of introduction of the second mixture into the first mixer.

Most preferably, the combining is in the first mixer, to produce the third mixture. Thus, in this most preferred embodiment, the second mixer is a side extruder that feeds the second mixture into the first mixer, wherein the second mixture is introduced into the first mixer downstream from the production of the first mixture, and the combined streams of first and second mixture continue in the first mixer, to produce the third mixture in the first mixer.

The First Mixer

Preferred conditions in the first mixer are:
i) a processing temperature in a range of from 100 to 250° C., preferably from 150 to 230° C., more preferably from 160 to 210° C., most preferably from 170 to 200° C.; and
ii) a processing pressure in the range of from 30 to 100 bar, more preferably in the range of from 50 to 90 bar.

A preferred type of first mixer is a co-rotating twin-screw extruder. Particularly preferred is a 32D/40 mm type of extruder, equipped with a screw which possesses from 2 to 6 mixing elements in the last barrel zone. Other xD length dimensions and screw diameters are also possible.

The Second Mixer

Preferred conditions in the second mixer are:
a processing temperature in a range of from 100 to 250° C., preferably from 150 to 230° C., more preferably from 160 to 210° C.;
a processing pressure in a range of from 1 to 100 bar, preferably from 5 to 70 bar, more preferably from 10 to 50 bar;
a screw speed so as to create the suitable shearing force; speed must be set up at a suitable level preferably ranging from 100 to 2000 rpm, more preferably from 500 to 1500, most preferably from 600 to 1200 rpm;
in terms of shear rate: with the most preferred speed and the same kneading elements configuration, a suitable shear rate is generated in a range of from $1/5$ $s^{-1}$ to $1/100$ $s^{-1}$, preferably from $1/10$ to $1/80$ $s^{-1}$, more preferably from $1/20$ to $1/60$ $s^{-1}$.

In the compounding process in the second mixer, heat is generated by the shearing and can increase the melt temperature by about 10 to 70° C. in the required processing zone. This effect is meaningful for favouring the carbon black reagglomeration and disaggregation process, and eventually the grafting reaction.

As the second mixer a co-rotating twin screw extruder is preferred. It is in particular a 54D/25 mm extruder, equipped with screws designed to provide high shear forces. Other xD length dimensions and screw diameters are also possible.

In a preferred embodiment, in step vi), the injection is into the third mixture, the third mixture being a melt.

The vinyl aromatic polymer used in accordance with the invention is based on one (or more) vinyl aromatic monomer (s), preferably styrene, and optionally one or more comonomers, i.e. it is a homopolymer or a copolymer.

The addition to styrene, a co-monomer of a specific styrene comonomer possessing steric hindrance, in particular p-tert-butylstyrene, or alpha-methyl styrene comonomer, or some other sterically hindered styrene comonomer, may advantageously increase the glass transition temperature of such a vinyl aromatic copolymer. In such a manner, the addition of a specific styrene comonomer to the styrene monomer improves the thermal stability of vinyl aromatic copolymer, which subsequently leads to better dimensional stability of moulded blocks made thereof.

The vinyl aromatic copolymer as used in the present invention is preferably comprised of 1 to 99 wt. % of styrene monomer and correspondingly 99 to 1 wt. % of p-tert-butylstyrene monomer, as follows (amounts in wt. %, based on the total amount of monomer):

| Monomer | Preferred (wt. %) | More preferred (wt. %) | Most preferred (wt. %) |
| --- | --- | --- | --- |
| Styrene | 1-99 | 50-99 | 70-98 |
| p-tert-Butyl styrene | 99-1 | 1-50 | 30-2 |

Alternatively, the vinyl aromatic copolymer as used in the present invention is preferably comprised of 1 to 99 wt. % of styrene monomer and correspondingly 99 to 1 wt. % of alpha-methyl styrene monomer, as follows (amounts in wt. %, based on the total amount of monomer):

| Monomer | Preferred (wt. %) | More preferred (wt. %) | Most preferred (wt. %) |
|---|---|---|---|
| Styrene | 1-99 | 50-98 | 75-95 |
| alpha-Methyl styrene | 99-1 | 2-50 | 25-5 |

Moreover, any content of carbon black in the homopolymer or copolymer may cause thermal instability. Thus, thermal aging of foam comprising carbon black has a significant influence on the final dimensions of moulded blocks. Carbon black may decrease the glass transition temperature of vinyl aromatic polymers or generally increase foam heat capacity, which leads to a shrinking or a change of dimensions of the moulded blocks during thermal conditioning. These phenomena may undesirably cause the formation of scrap during the sectioning of the moulded blocks. Thus, in a preferred embodiment of the present invention, the dimensional stability of foam blocks made of vinyl aromatic polymers and comprising carbon black is improved by preparing polymer foam from a vinyl aromatic copolymer with p-tert-butylstyrene or alpha-methyl styrene comonomer, or some other sterically hindered styrene comonomer. The carbon black additionally grafted in accordance with the present invention by the tert-butyl or alpha-methyl groups is better dispersed in the polymer matrix, and this as well leads to an improvement of thermal stability, thus accordingly the mechanical properties of expanded foam are upgraded, too.

Preferably, the vinyl aromatic polymer in the first and second copolymer components has an average number molecular weight in the range of from 40 to 150 kg/mol.

The First Polymer Component

The first polymer component can be a vinyl aromatic polymer having a melt index from 4 to 20 g/10 min, as measured according to ISO 1133.

The Second Polymer Component

The second polymer component can be a vinyl aromatic homopolymer or preferably copolymer with p-tert butyl styrene or alpha-methyl styrene, having a melt index ranging from 4 to 30 g/10 min, as measured according to ISO 1133.

The First Mixture

In addition to the first polymer component, the first mixture will ultimately comprise a first additive component a). First additive component a) preferably comprises one or more of a1) nucleating agent,
a2) flame retardant,
a3) synergist,
a4) thermal oxidative stabiliser,
a5) flame retardant thermal stabiliser, and
a6) dispersion aid.

The various constituents of first additive component a) may be added at different locations into the first mixer, to give the first mixture. One or more of these constituents a1) to a6) may even be added downstream from the introduction of the second mixture. However, it is preferred that constituents a1) to a6), if present in the granulate, are all introduced prior to the introduction of the second mixture, in view of their generally more limited (thermal) stability, as compared to the constituents of second additive component b).

For instance, a flame retardant system may be present, which is usually a combination of two types of compounds, namely a2) a brominated aliphatic, cycloaliphatic, aromatic or polymeric compound containing at least 50 wt. % of bromine, and a second compound (so called synergistic compound, a3)) which can be bicumyl (i.e. 2,3-dimethyl-2,3-diphenylbutane) or 2-hydro-peroxy-2-methylpropane, or dicumyl peroxide, cumene hydroxide, or 3,4-dimethyl-3,4-diphenylbutane.

The total content of flame retardant system, i.e. a2) plus a3), is typically in a range of from 0.1 to 5.0 wt. % with respect to the total weight of vinyl aromatic polymer (inclusive of solid and, if any, liquid additives, but exclusive of propellant), preferably between 0.2 and 3 wt. %. The weight-to-weight ratio of bromine compound a2) to synergistic compound a3) is preferably in a range of from 1:1 to 15:1, usually in a range of from 3:1 to 10:1, in particular from 2:1 to 7:1.

The Second Additive Component b)

Preferably, the second additive component b) comprises one or more powders.

Also, it is preferred that the second additive component b) is one or both of b1) a mineral constituent and b2) a carbonaceous constituent. Preferably, the second additive b) constituent consist of both b1) a mineral component and b2) a carbonaceous component.

The Mineral Component b1)

Preferably, mineral component b1) is one or more of
b1a) silica,
b1b) calcium phosphate,
b1c) mineral having perovskite structure, and
b1d) geopolymer and/or geopolymer composite.

b1a) Silica

The silica as typically used in accordance with the invention is amorphous and has the following specific properties:
(i) a BET surface, as measured according to the procedure explained below, in a range of from 1 to 100 $m^2/g$ and,
(ii) an average particle size within a range of from 3 nm to 1,000 nm.

The method to determine the silica's BET surface is based on the standards ASTM C1069 and ISO 9277 and is conducted as follows: in the first step, 2 to 5 g sample is dried at 105° C. and placed in a desiccator for cooling and further degassing. Subsequently, 0.3 to 1.0 g of the dry material is weighed into a test tube and placed in the degassing unit for about 30 min. Afterwards, the sample is transferred to the measuring unit and is measured using the Micromeritics Tristar 3000 instrument.

The silica as used according to the invention preferably has a BET surface in a range of from 3 to 80 $g/m^2$, more preferably 5 to 70 $m^2/g$, most preferably 8 to 60 $m^2/g$, such as 10 to 50 $m^2/g$, in particular 13 to 40 $m^2/g$, or 15 to 30 $m^2/g$, such as about 20 $m^2/g$.

Moreover, the silica as preferably used according to the present invention is defined as having an average particle size, as measured according to the procedure detailed below, of 3 nm to 1000 nm.

Average particle size in the description of the present invention means median primary particle size, D(v, 0.5) or d(0.5), and is the size at which 50% of the sample is smaller and 50% is larger. This value is also known as the Mass Median Diameter (MMD) or the median of the volume distribution.

The method to determine the silica's average particle size is conducted as follows: in the first step, 45 g of distilled water and 5 g of sample are placed into a beaker and stirred to allow the entire sample to be wetted. Subsequently, the sample is dispersed in an external ultrasonic probe for 5 min at 100% amplitude. The measurement is performed automatically using the primary agglomerate program in a Malvern MasterSizer 2000 device.

It is preferred that the average particle size of the silica as used according to the present invention is within a range of 20 to 800 nm, preferably 30 to 600 nm, such as 40 to 400 nm, in particular from 100 to 200 nm.

According to the present invention, the silica, if present, is preferably used in an amount of from 0.01 to less than 2 wt. %, based on the weight of the vinyl aromatic polymer in the granulate including solid and, if any, liquid additives, but exclusive of propellant, more preferably 0.1 to 1.6 wt. %, most preferably 0.5 to 1.5 wt. %, in particular 0.7 to 1.3 wt. %, such as about 1.0 wt. %. Preferably, the silica is spherically shaped silica.

It is most preferred that the silica a) as used according to the present invention comprises Sidistar type of material from ELKEM, typically with an average primary particle size of about 150 nm and a low BET surface: area of about 20, and most preferred is that a) is Sidistar T120.

b1b) Calcium Phosphate

The calcium phosphate b1b) as typically used according to the invention has a particle size, as measured by laser diffraction, of 0.01 μm to 100 μm. It is preferred that the particle size is from 0.1 μm to 50 μm, such as 0.5 μm to 30 μm.

The calcium phosphate is preferably tricalcium phosphate (specifically a type of hydroxyapatite).

According to the present invention, the calcium phosphate, if present, is preferably used in an amount of from 0.01 to 50 wt. %, based on the weight of vinyl aromatic polymer in the granulate including solid and, if any, liquid additives, but exclusive of propellant, more preferably 0.1 to 15 wt. %, most preferably 0.5 to 10 wt. %, in particular 1 to 8 wt. %.

b1c) Perovskite

In a preferred embodiment of the present invention, the thermal conductivity (as measured according to ISO 8301) is decreased, the mechanical properties are improved (compressive and bending strengths are increased, as measured according to EN 13163) and/or the self-extinguishing properties are improved (as measured according to EN ISO 11925, or even as measured according to DIN 4102/B1, B2) in vinyl aromatic polymer foam, by use of a mineral of the general formula $ABX_3$, A and B being cations and X being anions, wherein the mineral has perovskite crystal structure (in the following "mineral having perovskite structure", or "perovskite"). This type of additive reduces flame development by the creation of char with higher viscosity and thus reduces dripping and flaming.

The preferred concentration of perovskite for a pronounced decrease of the thermal conductivity, an additionally increase of self-extinguishing and mechanical properties is in a range of from 0.01 to 50 wt. %, based on the weight of vinyl aromatic polymer in the granulate including solid and, if any, liquid additives, but exclusive of propellant, more preferably 0.05 to 25 wt. %, most preferably 0.1 to 15 wt. %, in particular 0.5 to 12 wt. %, such as 1 to 8 wt. %.

The mineral having perovskite structure as used in accordance with the invention has a crystalline structure of general formula of $ABX_3$, where A and B are two cations of different sizes and X is an anion that bonds to both, the A atoms are larger than the B atoms, and its ionic radii close to that on the anion X thus they can form together a cubic (orthorhombic) close packing with space group Pm3m. In the structure, the B cation is 6-fold coordinated and A cation 12-fold coordinated with the oxygen anions. A ideal cubic perovskite structure has cations A at the corners of the cube, and cation B in the centre, with oxygen ions in the face-centered positions. For the stoichiometric oxide perovskites, the sum of the oxidation states of cations A and B should be equal to 6.

Preferably, A is selected from the group consisting of Ca, Sr, Ba, Bi, Ce, Fe, and mixtures thereof. Moreover, the A atom can be represented also by hybrid organic-inorganic groups, e.g. $(CH_3NH_3)^+$.

The B atom is preferably represented by Ti, Zr, Ni, Al, Ga, In, Bi, Sc, Cr, Pb as well as ammonium groups. The X atom is preferably represented by oxygen or halide ion, or mixtures thereof.

Among the most preferred representatives of perovskite structures are dielectric $BaTiO_3$, high-temperature semiconductor $YBa_2Cu_3O_{7-x}$, materials exhibiting magnetoresistance $R_{1-x}A_xMnO_3$, where $R=La^{3+}$, $Pr^{3+}$ or other earth ion, $A=Ca^{2+}$, $Sr^{2+}$, $Ba^{2+}$, $Bi^{2+}$, $Ce^{2+}$, and multiferroic materials.

Perovskites have large reflectance properties in the broad wavelength and a high optical constant, even in the far-infrared region. Hence, perovskites are infrared reflective materials that reflect infrared rays included in sunlight or the like and reduce the amount of absorbed energy in the infrared range.

A preferred perovskite has a BET surface size in the range of from 0.01 to 100 $m^2/g$, as measured according to the standards ASTM C1069 and ISO 9277 as explained above. The BET active surface is preferably in a range of from 0.05 to 50 $m^2/g$ and more preferable in a range of from 0.1 to 15 $m^2/g$.

Typical perovskites have a particle size in a range of from 0.01 to 100 μm, as measured according to the standard procedure using a Malvern Mastersizer 2000 apparatus. The particle size is preferably in a range of from 0.1 to 50 μm, more preferably in a range of from 0.5 to 30 μm.

Furthermore, it is preferred that the thermal conductivity, mechanical and self-extinguishing properties of the vinyl aromatic polymer foam are improved (the improvement in self-extinguishing being measured in accordance with DIN 4102 B1 and B2 test method) by the use of minerals with perovskite structure having an average particle size, as determined by laser diffraction, in the range of from 0.01 to 600 μm.

In a further preferred embodiment, the mineral having perovskite structure has a thermal conductivity of less than 10 W/m·K, preferably 5 W/m·K or less (300° C.)

It is further preferred that the mineral having perovskite structure has a moisture content in a range of from 0.01 to 3.0 wt. %, preferably in a range of from 0.05 to 1.5 wt. %.

b1d) Geopolymer

It has further been discovered that it is possible to maintain the foam's self-extinguishing and mechanical properties in the same range as in an expanded vinyl aromatic polymer without addition of filler or any other athermanous additive, while at the same time the thermal conductivity can be decreased significantly, namely by addition of a geopolymer, or a geopolymer composite prepared from geopolymer and various types of athermanous fillers. This is possible because the geopolymer itself gives fire resistance, and may in the composite encapsulate the particles of athermanous additive, especially those additives b) based on carbon, and separates them from any interactions with the flame, the vinyl aromatic polymer or the flame retardant. Geopolymer and/or geopolymer composite further decrease(s) thermal conductivity, based on a heat radiation scattering effect.

Geopolymers are a class of synthetic inorganic aluminosilicate materials formed by reaction of an alumino-silicate with a polysilicate solution under strong alkaline conditions.

Under these conditions, free $SiO_4$ and $AlO_4^-$ tetrahedral units are generated and linked, to yield polymeric precursors by sharing all oxygen atoms between two tetrahedral units, while water molecules are released. The tetrahedral units are balanced by group I cations ($Na^+$, $K^+$, $Li^+$, $Ca^{2+}$, $Ba^{2+}$, $NH_4^+$, $H_3O^+$), which must be present in the framework cavities to balanced the negative charge of $Al^{3+}$ in tetrahedral coordination ($AlO_4^+$). Additionally, this class of materials demonstrates ceramic-like properties, including extreme fire resistance. Geopolymers can be amorphous and crystalline materials and possess microstructure on a nanometer scale (observed by TEM) comprises small aluminosilicate clusters with pores dispersed within a highly porous network. The cluster size is between 5 and 10 nm. Their synthesis from aluminosilicate materials takes place by the so-called geopolymerization process, which involves polycondensation phenomena of aluminates and silicate groups with formation of Si—O—Al-type bonds. The original raw material used by Davidovits is metakaolinite, activated by sodium (or potassium) hydroxide and sodium (or potassium) silicate. Subsequently, Van Devender found that many other Si—Al materials could become the sources for making geopolymers, such as fly ash, furnace slag, silica fume, mine tailings, pozzolan, kaolin, building residues, and some natural minerals. After approximately several hours of curing, these materials exhibit excellent features such as light weight and high strength but are also ideally fire resistant, with non-toxic fumes and smokes, and resist all organic solvents.

In a preferred embodiment, geopolymers encapsulate carbon-based athermanous fillers in a matrix and limit the contact (interphase) between carbon-based filler, in particular carbon black and brominated flame-retardants, especially including those based on polystyrene-butadiene rubbers. It is well known that carbon black is a strong radical scavenger. The high shear forces applied in a twin-screw co-rotating extruder may cause degradation of polymeric brominated flame-retardants based on styrene-butadiene rubbers, with radical cross-linking and hydrogen bromide elimination. The self-extinguishing properties are significantly reduced due to this fact. The encapsulation of carbon black in a fire resistant and low-cost inorganic matrix is advantageous. This solution generally blocks any radical reactions with the carbon black, which would otherwise reduce the effectiveness of brominated flame-retardants. Encapsulation of carbon based fillers by the geopolymer matrix makes them completely inert to any radical reactions with vinyl aromatic polymer, brominated flame retardant and inactive in radical process inhibition of flame retardancy in which bromine radicals plays the major part. This phenomenon allows a significant decrease of the required concentration of brominated flame retardant in expandable vinyl aromatic polymer.

The subsequent idea was to find the way to stabilize the foamed structure uniformity. In addition, it was done by the addition of geopolymer or geopolymer composite. Because the geopolymers' nano-porous structure has a strong ability for the sorption of hydrocarbons, it was found that by sorption of blowing agent and then its desorption during foaming process the same very similar structure can be obtained independently from the content of geopolymer or geopolymer composite in the expandable vinyl aromatic polymer. It was surprisingly found that a uniform cell structure is optimum for thermal conductivity decrease.

A significant advantage of the application of geopolymer or geopolymer composite in expandable vinyl aromatic polymers is their ability to modify polymer viscosity during production by the extrusion and as well by the suspension polymerization method. Strong ionic forces created by the geopolymer relax cohesive force bonding macromolecules of polymer in the molten state. It was discovered that the pressure in the extrusion process can be reduced significantly and polymer flow in the die plate be considerably improved.

A preferred geopolymer composite is prepared by a process wherein an athermanous additive component is present during the production of geopolymer composite, so that the geopolymer composite incorporates the athermanous additive component. Preferably, this athermanous additive component comprises one or more athermanous additives selected from the group consisting of
 a. carbon black, petroleum coke, graphitized carbon black, graphite oxides, various types of graphite (especially poor and amorphous forms with a carbon content in the range of from 50 to 90%) and graphene, and
 b. titanium oxides, ilmenite, rutiles, chamotte, fly ash, fumed silica, hydromagnesite/huntite mineral, barium sulfate and mineral having perovskite structure,
preferably the athermanous additive component comprises one or more carbon-based athermanous additives selected from the group of heat absorbers and heat reflectors, in particular the athermanous additive component is carbon black, graphite, or a mixture thereof.

Further details of the preparation of geopolymer composite may be found in the international application entitled "Geopolymer and composite thereof and expandable vinyl aromatic polymer granulate and expanded vinyl aromatic polymer foam comprising the same", PCT/EP2016/050594, filed on even date herewith.

According to a first preferred embodiment of the present invention, the mineral constituent b1) is b1a), the specific type of silica.

According to a second preferred embodiment of the present invention, the mineral constituent b1) is b1b), the specific type of calcium phosphate.

According to a third preferred embodiment, the mineral constituent b1) is b1c), mineral having perovskites structure.

According to a fourth preferred embodiment, the mineral constituent b1) is b1d), geopolymer and/or geopolymer composite.

According to a fifth preferred embodiment of the present invention, the mineral constituent b1) is a mixture of minerals b1a) the specific type of silica, and/or b1b) the specific type of calcium phosphate, b1c) mineral having perovskites structure and/or b1d) geopolymer and/or geopolymer composite.

Most preferred is a second additive component b) comprising b1a) the specific type of silica and/or b1b) the specific type of calcium phosphate, b1c) mineral having perovskite structure, and/or b1d) geopolymer and/or geopolymer composite, with b2a) carbon black.

Moreover, it is not necessary in accordance with the present invention that the respective constituents of additive combinations a) and b), respectively, are added at the same time. Instead, it is sufficient if the first and second additive components as added to give the first and second mixture, respectively, consist of one single constituent each, and any further constituent may be added downstream, if desired.

According to the present invention, the total amount of component b1) i.e. the sum of the amounts of b1a) silica as specified (if present) and b1b) calcium phosphate as specified (if present), b1c) mineral having perovskites structure (if present) and b1d) geopolymer and/or geopolymer composite (if present) respectively, is 0.01 to less than 50 wt. % based on the weight of vinyl aromatic polymer in the granulate including additives, but exclusive of propellant. If each of b1a) the specific silica and b1b) the specific calcium phosphate, b1c) the mineral having perovskite structure and b1d) the geopolymer and/or geopolymer composite is present, then the minimum total amount of b1) is preferably 0.1 wt. %, based on the weight of vinyl aromatic polymer in the granulate including additives, but exclusive of propellant.

The carbonaceous constituent b2) is preferably one or more of
b2a) carbon black,
b2b) graphite, and
b2c) coke.

Most preferably, the carbonaceous constituent b2) consist of one or both of b2a) carbon black and b2b) graphite.

Carbon Black

The carbon black as preferably used according to the invention has a BET surface, as measured according to ASTM 6556, of more than 40 to 250 $m^2/g$.

It is preferred that the BET surface of the carbon black as used according to the invention is from 41 to 200 $m^2/g$, preferably from 45 to 150 $m^2/g$, in particular from 50 to 100 $m^2/g$.

The sulphur content of the carbon black as preferably used according to the invention is in the range of from 50 to 20,000 ppm, as measured according to ASTM D1619, preferably from 3,000 to 10,000 ppm.

The carbon black is preferably present in an amount of 0.1 to 12 wt. %, based on the weight of the vinyl aromatic polymer in the granulate including additives, but exclusive of propellant, preferably 0.2 to 12.0 wt. %, more preferred 0.5 to 9.0 wt. %, such as 1.0 to 8.0 wt. %, in particular 2.0 to 7.0 wt. %, such as 3.0 to 6.0 wt. %, e.g. about 5.0 wt. %.

Graphite

The graphite as preferably used in the invention as b2b) has the following properties:
(i) a carbon content in the range of 50 to 99.99 wt. %, preferably in the range of 95 to 99.9 wt. % and more preferably over 99.5 wt. %, as measured according to internal method of GK company L-03-00.
(ii) a particle size in the range of 0.01 to 50 μm, preferably 5 to 8 μm, as measured with internal laser diffraction method L-12-00 using Cilas 930.

Most preferred, and for a further reduction of the thermal conductivity of the vinyl aromatic polymer foam, is a combination of
b1a) silica and/or b1b) calcium phosphate b1c) mineral having perovskite structure and/or b1d) geopolymer and/or geopolymer composite, with
b2a) carbon black and/or b2b) graphite.

In addition to the additive components a) and b) above, the materials according to the invention (the polymer composition, the granulate, the foam, and the masterbatch) may contain further additives, as is set out below.

It is further preferred according to the present invention that the combining v), to produce the third mixture, is of
a melt of the first mixture with
a melt of the second mixture from the second mixer, preferably directly from the second mixer.

Thus, the melt from the second mixture from the second mixer is combined with the melt of the first mixture, which is particularly advantageous in terms of energy efficiency.

Alternatively, the process according to the invention can be performed such that the combining v), to produce the third mixture, is of a melt of the first mixture with
a masterbatch of the second mixture from the second extruder, preferably wherein the second mixture is cooled when exiting the second mixer.

In this alternative embodiment using a masterbatch, the process provides for a separate processing of first and second additives, and is therefore advantageous, as explained above. However, since the second mixture is not, as in the preferred embodiment referred to above, as a melt directly combined with a melt of the first mixture, this alternative process is energetically less advantageous, and therefore less preferred. In this alternative embodiment, the second mixture is preferably first cooled and then reheated, and then combined v) with the first mixture.

In all embodiments of the process of the invention, the severe processing conditions in the second mixer comprise higher shearing, as compared to the conditions in the first mixer.

A process scheme showing a preferred embodiment of the present invention is shown in the FIGURE.

The expandable vinyl aromatic polymer granulate may for instance be prepared in an exemplary extrusion process comprising the following steps:
1) feeding of vinyl aromatic polymer into the main co-rotating twin screw extruder together with
  a1) nucleating agent and
  flame retardant system (comprising a2) flame retardant plus a3) synergist),
  a4) thermal oxidative stabiliser,
  a5) flame retardant thermal stabiliser (bromic acid scavengers) and
  a6) dispersion aid).
2) feeding of vinyl aromatic polymer into the side arm co-rotating twin screw extruder together with the powder forms
  of b1a) silica and/or b1b) calcium phosphate, b1c) mineral having perovskite structure and/or b1d) geopolymer and/or geopolymer composite and b2a) carbon black; or
  of b1a) silica and/or b1c) calcium phosphate, b1c) mineral having perovskite structure and/or b1d) geopolymer and/or geopolymer composite and b2b) graphite,
3) injecting blowing agent into the melt of vinyl aromatic polymer comprising the additives a) and b) mentioned above,
4) extruding the homogenous melt comprising 1), 2) and 3) through the single screw cooling extruder,
5) pelletizing the mixture in an underwater pelletizer under suitable pressure, so as to obtain the granulate.

In steps i) and ii) according to the process of the invention, vinyl aromatic polymer (in particular polystyrene homopolymer or its vinyl copolymer for instance with p-tert-butylstyrene, or the mixture of different types of polystyrene with different MFI index), a1) nucleating agent together with flame retardant system (i.e. a2+a3)) are fed into a twin co-rotating screw extruder. The temperature in the extruder is preferably in the range of from 100 to 250° C., more preferably of 150 to 230° C. Preferably, the vinyl aromatic polymer has an average molecular weight in the range of from 40 to 150 kg/mol.

In steps iii) and iv) according to the process of the invention,
b2a) carbon black, and b1a) silica or/and b1b) calcium phosphate, b1c) mineral having perovskite structure and/or b1d) geopolymer and/or geopolymer composite, or only b1c) mineral having perovskite structure or only b1a) specific mixture of silica or only b1b) calcium phosphate or only b1d) geopolymer and/or geopolymer composite, with b2b) graphite are added in the form of powders; the addition of the compacted form is also possible.

The first advantageous effect in step iv) according to the process of the invention is a proper preliminary dispersion of IR-absorber additives in polystyrene. Thus, to provide good preliminary dispersion, the powder additives are preferably compounded with the vinyl aromatic polymer in a weight ratio from 10:90 up to 60:40. Subsequently, it was observed that the proper dispersion of additives in the vinyl aromatic polymer and copolymer melt can be further improved by addition of specific silanes, in particular triethoxy(phenyl) silane.

The second advantageous effect in step iv) according to the process of the invention is that it may provide grafting of carbon black by vinyl aromatic copolymer based on comonomers in particularly para-tert-butyl styrene or monomers such as para-vinyl toluene, other methylstyrene isomers, divinylobenzene and its isomers.

It was surprisingly found according to the invention that the self-extinguishing properties can be improved by improvement of flame retardant dispersion. This was achieved by the incorporation of dispersion aids in particularly copolymers of styrene and maleic anhydride with maleic anhydride content in copolymer in range of 5-50%, preferably 10-30%, more preferably 10-20% or BYK dispersive agents in the same concentrations.

Because the a2) polymeric brominated styrene-butadiene rubber is quite sensitive to thermal and mechanical degradation, a package of a5) thermal stabilizers and a4) bromic acid scavengers may be used to improve its thermal stability at processing temperatures of 150 to 230° C. and relatively high shear rates. The package is preferably used in a total amount not higher than 2 wt. % by the weight of solid additives.

In step v) according to the process of the invention, the first and second mixtures are combined, to produce a third mixture.

Subsequently, in step vi) according to the process of the invention, the blowing agent (propellant) is injected and dissolved in the third mixture (preferably melt) in the last sections of the main co-rotating twin-screw extruder. Typically, blowing agents used are n-pentane, cyclopentane, i-pentane, combination of two of them or their mixture. In addition, halogenated aliphatic hydrocarbons or alcohols containing from 1 to 3 carbons are commonly used.

Then the mass including propellant is in step vii) according to the process of the invention transported and cooled in the so-called "cooling extruder", from a temperature 230° C. down to 150° C.

Finally, in step viii) according to the process of the invention, the homogenous polymer mixture ("fourth mixture") comprising
  b1a) silica and/or b1b) tricalcium phosphate and/or b1c) mineral having perovskite structure and/or b1d) geopolymer and/or geopolymer composite with b2a) carbon black, or mixture of b2b) graphite with b1a) silica and/or b1b) tricalcium phosphate and/or b1c) mineral having perovskite structure and/or b1d) geopolymer and/or geopolymer composite in a weight ratio of 1:3, and
  a1) nucleating agent and
  flame retardant system (a2+a3) and
  optionally with above mentioned a6) dispersion agents and
  c) blowing agents
is extruded through the static mixer, polymer melt filter, diverter valve, finally die-holes and cut by rotating knifes in a pressurized underwater pelletizer unit in order to obtain micro-pellets (granulate).

Pellets are preferably pre-treated by applying a coating of a mixture of mono- and triglycerides of fatty acids and stearic acid salts and then pre-expanded by use of steam.

In a second aspect, the invention relates to expandable vinyl aromatic polymer granulate (particles) as prepared by the extrusion process according to the first aspect of the invention.

Preferably, the parameters relating to the b1a) silica, b1b) calcium phosphate, b1c) mineral having perovskite structure, bid) geopolymer and/or geopolymer composite, b2a) carbon black, mixture of b1a) silica, b1b) calcium phosphate, b1c) mineral having perovskite structure, b1d) geopolymer and/or geopolymer composite and b2) graphite and furthermore the use of styrene copolymer with p-tert-butylstyrene, set out above in relation to the process equally apply to the expandable vinyl aromatic polymer granulate.

Preferably, the expandable vinyl aromatic polymer granulate further comprises one or more athermanous additives selected from petroleum coke, graphitized carbon black, graphite oxides, and graphene.

In a third aspect, the invention relates to expanded vinyl aromatic polymer foam.

The foam in accordance with the invention typically has a density of 8 to 30 kg/m$^3$, and a thermal conductivity of 25 to 35 mW/K·m.

It is noted that, unlike the properties of the additives as starting materials, the properties of additives as contained in granulate or foam are notoriously difficult to determine. It is often considered more appropriate in the art to characterize the additives in granulate and foam with reference to the properties of the additives as initially used.

The advantages of the present invention become apparent from the following examples. Unless indicated otherwise, all percentages are given by weight.

Moreover, whenever reference is made in the present description of the invention to an amount of additive "by weight of vinyl aromatic polymer", this refers to the amount of the additive by weight of polymer inclusive of (solid and, if any, liquid) additives, but exclusive of propellant.

EXAMPLES

In accordance with the invention, expandable vinyl aromatic polymer granulate was prepared in an extrusion process, with addition of athermanous fillers in powder form (Examples 1 to 15):

Example 1

General purpose polystyrene (Synthos PS 585X) was dosed to a co-rotating main twin screw extruder (32D/40 mm), together with flame retardant (Emerald 3000) in an amount of 2.5 wt. %, bicumyl in an amount of 0.5 wt. %, Irganox 1010 in an amount of 0.125 wt. %, Irgafos 126 in an amount of 0.125 wt. % and Epon 164 in an amount of 0.25 wt. %. The melt temperature in main extruder was 180° C.

To the co-rotating side arm (54D/25 mm) twin-screw extruder (the general purpose polystyrene (Synthos PS 585X) was dosed to the main hopper, and type R350 carbon black (from Cabot Corporation) with a BET surface of 55.0 m²/g in a concentration of 5 wt. %, spherically-shaped amorphous silicon dioxide from ELKEM in an amount of 1 wt. %, and tricalcium phosphate (Expandia R from Innophos) in an amount of 3 wt. % (all premixed first to perform one consistent mixture) were dosed via one side feeder. The melt containing 40 wt. % of concentrated carbon black with mineral athermanous fillers was transported to the main extruder. The melt temperature inside the extruder was 190° C.

The blowing agent (n-pentane/isopentane mixture 80/20%) was injected to the main 32D/40 mm extruder downstream from the injection of the melt from the side twin-screw extruder. The concentration of blowing agent was 5.5 wt. %, calculated on total mass of product.

The melt of vinyl aromatic polymer containing flame retardant, bicumyl, carbon black, mineral athermanous fillers and blowing agent was transported to the 30D/90 mm cooling extruder and pumped through a static mixer, melt pump, screen changer, diverter valve and extruded through the die head with 0.75 mm diameter holes, and underwater pelletized by the rotating knives. Downstream, the rounded product, a granulate with a particle size distribution of 99.9% of the fraction 0.8-1.6 mm was centrifuged to remove the water, and was finally coated by the suitable mixture of magnesium stearate with glycerine monostearate and tristearate. The melt temperature in the cooling extruder was 170° C.

The coated beads were expanded to measure the final general properties of expanded foam composite:

thermal conductivity according to standard ISO 8301.
mechanical properties (compressive and bending strength) according to standard EN 13163.
flammability according to tests methods: EN ISO 11925-2 and preferably even DIN 4102 B1, B2.

Example 2

The components according to Example 1 were used, with further addition of styrene maleic anhydride copolymer containing 15% of maleic anhydride in an amount of 1 wt. % to the main co-rotating twin-screw extruder.

Example 3

The components according to Example 2 were used, with further addition of brominated bisphenol resin (F 22000 HM) in an amount of 1 wt. % in the main co-rotating twin screw extruder.

Example 4

The components according to Example 3 were used, but instead of silica and tricalcium phosphate, calcium titanate in an amount of 3 wt. % was used in the side co-rotating twin screw extruder.

Example 5

The components according to Example 4 were used, but with a concentration of calcium titanate in an amount of 5 wt. %.

Example 6

The components according to Example 1 were used, but with calcium titanate in an amount of 6 wt. % instead of carbon black, silica and tricalcium phosphate.

Example 7

The components according to Example 1 were used, but with barium titanate in an amount of 6 wt. % instead of carbon black, silica and tricalcium phosphate. The flame retardant was added in an amount of 1.5 wt. %, and the bicumyl in an amount of 0.3 wt. %. The material was prepared without addition of XIRAN 15170, F 2200 HM, Irganox 1010 and Irgafos 126.

Example 8

The components according to Example 5 were used, but with general purpose polystyrene (Synthos PS 585X) modified by para-tert-butyl styrene comonomer (content of 40%), added in an amount of 15 wt. % to the side twin-screw co-rotating extruder (i.e 6% of p-TBS in the total mixture) instead of 15 wt. % of the standard grade of PS 585X based on the total amount of polystyrene.

Example 9

The components according to Example 1 were used. Instead of carbon black, 3 wt. % of graphite CR5995 from GK company, together with silica, were added. Flame retardant in an amount of 2 wt. % without thermo-oxidative stabilizers and Epon 164 was used.

Example 10

The components according to Example 9 were dosed and the graphite CR5995 content was increased from 3 to 4 wt. %. The Sidistar content was maintained at a 1:3 weight ratio to the CR5995 graphite.

Example 11

The components according to Example 9 were dosed. The graphite CR5995 content was increased from 3 to 5 wt. %. The Sidistar silica was absent from the composition. This example was performed to show that even better foam properties are obtained when following Examples 9 and 10 (where the graphite content is lower and Sidistar silica is used), whereas 5 wt. % of graphite are used in Example 11.

Example 12

The components according to Example 9 were dosed; and the silica was replaced with 2 wt. % of calcium titanate.

Example 13

The components according to Example 6 were dosed; and the calcium titanate was replaced with 10 wt. % of pure geopolymer powder having a mean particle size of 6 μm.

Example 14

The components according to Example 13 were dosed; and the geopolymer powder was replaced with 16 wt. % of a. geopolymer composite containing 25 wt. % of petroleum coke (coke type Ranco 9895), the mean particle size of the geopolymer composite was 6 μm.

Example 15

The components according to Example 14 were dosed; and the geopolymer composite with Ranco 9895 was replaced with 15 wt. % of a geopolymer composite (mean particle size 6 μm) containing 20 wt. % of Monarch 460 furnace carbon black with a surface area 71.8 m²/g.

TABLE 1

Summary of Examples 1 to 15.

| Components (wt. %) | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| GP585X | + | + | + | + | + | + | + | + | + | + | + | + | + | + | + |
| GP585X with 40% of p-TBS | – | – | – | – | – | – | – | 15 | – | – | – | – | – | – | – |
| R350 | 5 | 5 | 5 | 5 | 5 | – | – | 5 | – | – | – | – | – | – | – |
| Graphite GK CR5995 | – | – | – | – | – | – | – | – | 3 | 4 | 5 | 3 | – | – | – |
| Geopolymer | – | – | – | – | – | – | – | – | – | – | – | – | 10 | – | – |
| Geopolymer composite (Ranco 9895) | – | – | – | – | – | – | – | – | – | – | – | – | – | 16 | – |
| Geopolymer composite (Monarch 460) | – | – | – | – | – | – | – | – | – | – | – | – | – | – | 15 |
| Calcium titanate | – | – | – | 3 | 5 | 6 | – | 5 | – | – | – | 2 | – | – | – |
| Barium titanate | – | – | – | – | – | – | 6 | – | – | – | – | – | – | – | – |
| Sidistar T120 | 1 | 1 | 1 | – | – | – | – | – | 1 | 1.3 | – | – | – | – | – |
| Tricalcium phosphate | 3 | 3 | 3 | – | – | – | – | – | – | – | – | – | – | – | – |
| Flame retardant | 2.5 | 2.5 | 2.5 | 2.5 | 2.5 | 1.5 | 1.5 | 1.5 | 2 | 2 | 2 | 1.0 | 1.5 | 1.5 | 1.5 |
| XIRAN SZ15170 | – | 1 | 1 | 1 | 1 | – | – | 1 | – | – | – | – | – | – | – |
| Bicumyl | 0.5 | 0.5 | 0.5 | 0.5 | 0.5 | 0.3 | 0.3 | 0.3 | 0.4 | 0.4 | 0.4 | 0.2 | 0.3 | 0.3 | 0.3 |
| F 2200 HM | – | – | 1 | – | – | – | – | – | – | – | – | – | – | – | – |
| Irganox 1010 | 0.125 | 0.125 | 0.125 | 0.125 | 0.125 | – | – | 0.075 | – | – | – | – | – | – | – |
| Irgafos 126 | 0.125 | 0.125 | 0.125 | 0.125 | 0.125 | – | – | 0.075 | – | – | – | – | – | – | – |
| Epon 164 | 0.25 | 0.25 | 0.25 | 0.25 | 0.25 | – | – | 0.175 | – | – | – | – | – | – | – |
| Polywax 2000 | 0.3 | 0.3 | 0.3 | 0.3 | 0.3 | 0.1 | 0.1 | 0.3 | 0.3 | 0.3 | 0.3 | 0.1 | 0.1 | 0.1 | 0.1 |
| Pentane/Iso pentane 80/20 | 5.5 | 5.5 | 5.5 | 5.5 | 5.5 | 5.5 | 5.5 | 5.5 | 5.5 | 5.5 | 5.5 | 5.5 | 5.5 | 5.5 | 5.5 |

TABLE 2

Examples 1 to 15. Final product parameters at a foam density of ca. 19.0 g/l.

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Glass transition (° C.)/ASTM D7426/ | 92 | 93 | 93 | 94 | 95 | 97 | 98 | 105 | 95 | 94 | 93 | 87 | 102 | 99 | 98 |
| Thermal conductivity (mW/m · K)/ISO 8301/ | 31.5 | 31.0 | 30.9 | 30.0 | 29.5 | 32.0 | 31.2 | 29.6 | 30.4 | 29.0 | 30.3 | 29.2 | 31.6 | 32.7 | 29.5 |
| Flammability/EN ISO 11925-2/ | + | + | + | + | + | + | + | + | + | + | + | + | + | + | + |
| Flammability/DIN 4102 B1/B2/ | –/– | –/– | –/+ | –/+ | +/+ | +/+ | +/+ | +/+ | +/+ | +/+ | +/+ | +/+ | +/+ | +/+ | +/+ |
| Compressive strength at 10% def. (kPa)/EN 13163/ | 98 | 100 | 95 | 114 | 120 | 127 | 124 | 131 | 120 | 118 | 104 | 124 | 132 | 120 | 121 |

TABLE 2-continued

Examples 1 to 15. Final product parameters at a foam density of ca. 19.0 g/l.

| | Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Bending strength (kPa)/EN 13163/ | 185 | 190 | 180 | 200 | 209 | 213 | 209 | 222 | 200 | 201 | 189 | 215 | 231 | 210 | 219 |

Passed (+ or B2 or B1);
Not passed (−)

Examples 16 to 29: Preparation of Expandable Vinyl Aromatic Polymer Granulate in an Extrusion Process with the Addition of Athermanous Fillers in the Form of a Masterbatch Example 16

The general-purpose polystyrene (Synthos PS 585X) was dosed to the co-rotating main twin-screw extruder. The following raw materials were dosed in the form of 50 wt. % concentrated masterbatch prepared on the same main extruder used in Example 1: Emerald 3000 (2.5 wt. %), bicumyl (0.5 wt. %), Irganox 1010 (0.125 wt. %), Irgafos 126 (0.125 wt. %) and Epon 164 (0.25 wt. %), F 2200 HM (1 wt. %), XIRAN 15170 (1 wt. %). The carbon black, namely R350 (5 wt. %), spherically shaped amorphous silicon dioxide (1 wt. %) and Expandia R (3 wt. %) were dosed in the form of 40 wt. % masterbatch prepared on the same side extruder used in the process of Example 1.

Examples 17-29

The process according to Example 16 was used and components with concentrations according to Examples 2-15 were used.

Results for Examples 16-29 as prepared with the masterbatch process are equivalent to those obtained for Examples 1-15 as prepared with the (direct) side extrusion process.

The invention claimed is:

1. Extrusion process for the production of expandable vinyl aromatic polymer granulate comprising the steps:
   i) feeding a first polymer component comprising a first vinyl aromatic polymer into a first mixer;
   ii) feeding a first additive component a) into the first mixer, to produce a first mixture from the first polymer component and the first additive component;
   iii) feeding a second polymer component b) comprising a second vinyl aromatic polymer into a second mixer;
   iv) feeding a second additive component b) into the second mixer, to produce a second mixture from the second polymer component and the second additive component, wherein the processing conditions in the second mixer are more severe than the processing conditions in the first mixer, by providing higher shear force;
   v) combining the first and second mixtures, to produce a third mixture;
   vi) injecting blowing agent c) into the third mixture, to produce a fourth mixture;
   vii) mixing the fourth mixture; and
   viii) pelletizing the fourth mixture, to obtain the granulate, wherein
   the process comprises an extrusion;
   the first additive component a) comprises one or more of
   a1) nucleating agent,
   a2) flame retardant,
   a3) synergist,
   a4) thermal oxidative stabiliser,
   a5) flame retardant thermal stabiliser, and
   a6) dispersion aid;
      the second additive component b) comprises
   b1) a mineral constituent comprising silica and
   b2) a carbonaceous constituent comprising graphite; and
      the second mixer is an extruder or a static mixer.

2. The process of claim 1, wherein the combining v) is a feeding of the second mixture into the first mixer, to produce the third mixture.

3. The process of claim 1, wherein the first mixer is an extruder or a static mixer.

4. The process of claim 1, wherein the temperature in the first mixer is in the range of 100 to 250° C.

5. The process of claim 1, wherein the second mixer is a co-rotating twin screw extruder.

6. The process of claim 1, wherein vi) the injection is into the third mixture, the third mixture being a melt.

7. The process of claim 1, wherein the second additive component b) comprises one or more powders.

8. The process of claim 1, wherein the second additive component b) consists of silica and graphite.

9. The process of claim 1, wherein the mineral constituent b1) further comprises
   b1b) calcium phosphate,
   b1c) mineral having perovskite structure, or
   b1d) geopolymer and/or geopolymer composite.

10. The process of claim 9, wherein
   b1a) the silica is amorphous and has
      a BET surface of 1 to 100 m$^2$/g,
      an average particle size within the range of from 3 nm to 1,000 nm, and
   the silica is present in an amount of 0.01 to less than 2 wt. %, based on the weight of the vinyl aromatic polymer in the granulate (inclusive of solid and, if any, liquid additives, but exclusive of propellant),
   b1b) the calcium phosphate has a particle size of 0.5 μm to 30 μm, and
   the calcium phosphate, if used, is present in an amount of 0.5 to 10 wt. %, based on the weight of the vinyl aromatic polymer in the granulate (inclusive of solid and, if any, liquid additives, but exclusive of propellant), and
   b1c) the mineral having perovskite structure has
      a BET surface in a range of from 0.1 to 15 m$^2$/g, and
      a particle size in the range of from 0.5 to 30 μm, and the mineral having perovskite structure, if used, is present in an amount of 0.5 to 10 wt. %, based on the weight of the vinyl aromatic polymer in the granulate (inclusive of solid and, if any, liquid additives, but exclusive of propellant).

11. The process of claim 9, wherein the calcium phosphate is tricalcium phosphate.

12. The process of claim 1, wherein the carbonaceous constituent b2) further comprises b2a) carbon black and b2b) graphite.

13. The process of claim 12, wherein
b2a) the carbon black has
a BET surface of more than 40 up to 250 m²/g, as measured according to ASTM 6556, and
a sulphur content in the range of from 50 to 20,000 ppm, as measured according to ASTM D 1619, and
the carbon black is present in an amount of 0.1 to 12 wt. %, based on the weight of the vinyl aromatic polymer in the granulate including solid and, if any, liquid additives, but exclusive of propellant.

14. The process of claim 1, wherein either or both of the first and second vinyl aromatic polymer is a copolymer made from styrene and a sterically hindered styrene comonomer,
wherein the styrene-based copolymer comprises 1 to 99 wt. % of p-tert-butylstyrene comonomer, based on the total weight of monomer.

15. The process according to claim 1, wherein the combining v), to produce the third mixture, is of
a melt of the first mixture with
a melt of the second mixture from the second mixer.

16. The process according to claim 1, wherein the combining v), to produce the third mixture, is of
a melt of the first mixture with
a masterbatch of the second mixture from the second extruder.

17. The process according to claim 16, wherein the second mixture is first cooled and then reheated, and then combined v) with the first mixture.

18. The process according to claim 1, wherein the severe processing conditions in the second mixer comprise a shear rate in a range of from $1/5$ $s^{-1}$ to $1/100$ $s^{-1}$.

19. The process of claim 2, wherein the combining v) is in the first mixer, to produce the third mixture.

20. The process of claim 3, wherein the first mixer is a co-rotating twin screw extruder.

21. The process of claim 4, wherein the temperature in the first mixer is in the range of 150 to 230° C.

22. The process of claim 10, wherein
b1a) the silica is amorphous and has
a BET surface of 15 to 30 m²/g,
an average particle size within the range of from 40 to 400 nm, and
the silica is present in an amount of 0.5 to 1.5 wt. % based on the weight of the vinyl aromatic polymer in the granulate (inclusive of solid and, if any, liquid additives, but exclusive of propellant).

23. The process of claim 1, wherein both the first and second vinyl aromatic polymer are polystyrene homopolymer.

* * * * *